(No Model.)

G. FISCHER.
HARNESS DETACHING DEVICE.

No. 436,226. Patented Sept. 9, 1890.

Witnesses:

Inventor
Gustav Fischer.
By O. E. Duffy
Attorney

UNITED STATES PATENT OFFICE.

GUSTAV FISCHER, OF GREIZ, GERMANY.

HARNESS-DETACHING DEVICE.

SPECIFICATION forming part of Letters Patent No. 436,226, dated September 9, 1890.

Application filed January 31, 1890. Serial No. 338,704. (No model.)

*To all whom it may concern:*

Be it known that I, GUSTAV FISCHER, of Greiz, in the Kingdom of Prussia and German Empire, have invented new and useful Improvements in Locks for the Automatic Releasing of Transmitting-Belts, Horse-Traces, and the Like, of which the following is a specification, reference being had therein to the accompanying drawings.

My invention relates to improvements in locks for the automatic releasing of transmitting-belts, horse-traces, and the like.

According to my invention I construct the fastener in such a manner that when in use the halves of the fastener can be at once disconnected should occasion arise. For example, if my improved fastener were used in connection with harness a runaway horse could be disconnected from the carriage, or the fastener could be used in other situations where a rapid disconnection of attaching parts would avert danger.

Figure 1:
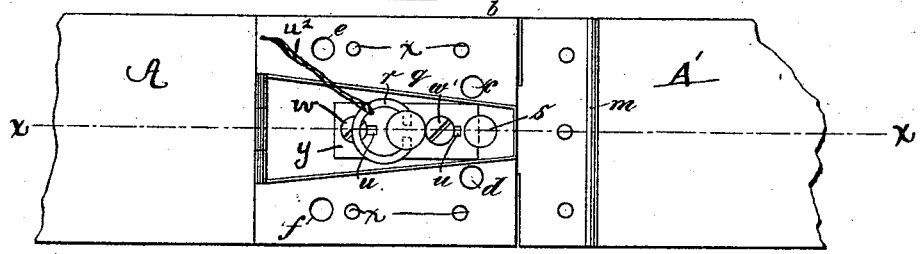
Figure 2:
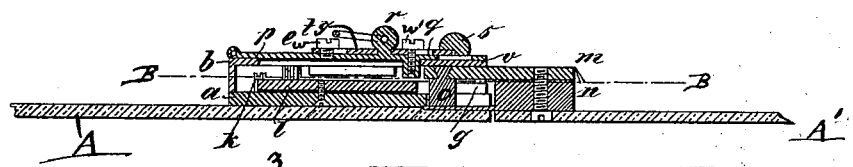
Figure 3:
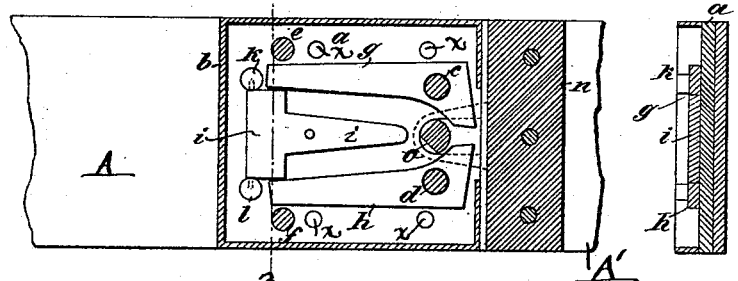
Figure 4:
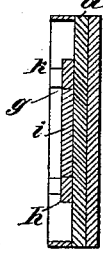
Figure 5:
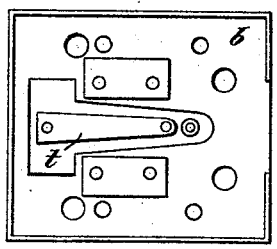

In the annexed drawings, Figure 1 is a top or plan view of my improved fastener employed to connect the ends A A' of a belt or strap. Fig. 2 is a longitudinal sectional view of the fastener at the line $x\ x$, Fig. 1. Fig. 3 is a plan view at the line B B, Fig. 2, the covering in top plate $b$ being removed so as to show the parts. Fig. 4 is a cross-section of Fig. 3 at the line $z\ z$. Fig. 5 is an inner view of the covering in plate $b$.

The fastener is made of a strong sole-plate $a$ and a lighter covering-plate $b$, which is secured to the sole-plate $a$ by the studs $c\ d\ e\ f$, the sole-plate being secured to the end of the belt by four rivets $x\ x\ x\ x$. Upon the studs $c$ and $d$, I pivot levers $g\ h$, which, when the fastener is secure, occupy the position shown in Fig. 3. At the other end of the sole-plate $a$, I hinge a T-plate $i$ to the studs $k$ and $l$.

The free longer ends of the levers $g\ h$ lie against the head of the T-shaped plate $i$, while the two heels of the levers $g\ h$ stand at a certain distance apart. The sides of the head of the T-shaped plate $i$ are inclined, as clearly shown in the sectional view, Fig. 4, and the sides of the levers $g\ h$ are similarly inclined at the part where they rest in contact with the said T-shaped lever $i$, from which it will be clearly seen that if the T-lever $i$ were free to turn on its hinges $k\ l$ it would yield upward to side pressure exerted by the levers $g\ h$, and thus be cleared out of their way.

The portion of the fastener which is attached to the end A' of the belt consists of a block $n$, carrying a projecting plate $m$, to which there is riveted a downwardly-projecting stud $o$, which, when the halves of the fastener are united, stands in front of the heels of the levers $g\ h$. So long as the levers $g\ h$ are held in the position shown at Fig. 3 the stud $o$ cannot escape between the heels; but if the T-plate $i$ were turned upon its hinges out of the path of the ends of the levers $g\ h$, so as to allow the said ends to come together, the opening between the heels becomes sufficiently enlarged to allow the stud $o$ to slip through, thus causing the halves of the fastener to become disconnected. The means whereby I prevent the said T-piece $i$ from turning on its hinges, and thus keep the halves of the fastener together, are as follows: Upon the top plate $b$, I hinge a door $p$, and on the said door $p$, I mount a sliding bar $y$, attached by pins $w\ w'$ to the door $p$, the said pins occupying slots $u$, which permit the lock-plate $y$ to have a to-and-fro movement. The front part or nose of the bar $y$ goes beneath a catch $s$, projecting from the plate $b$. The pin $w'$ screws into a stop, which rests upon and holds down the hinged T-shaped plate $i$. A spring $t$ at the back of the sliding lock-plate $y$ prevents it from becoming loosened by jarring or sliding back of itself.

Under working conditions the tendency of the levers $g\ h$ is to lift the plate $i$ and force open the door $p$; but so long as the door is kept secured by the sliding bar $y$ this cannot occur.

The bar $y$ carries a ring-bolt $r$ and ring, and a line or cord $u^2$ is attached to this ring, so that in the case of harness, for example, if the horse should bolt and there is no way of stopping him, by pulling on the lines attached to the rings on the trace-fasteners the bar $y$ in each fastener is pulled back, and the strain exercised through the stud $o$ on the levers $g\ h$ forces them together and makes them lift the T-plate $i$ and door $p$ and turn on their points, so as to enlarge the opening between the heels, thus allowing the stud $o$ to escape and dissevering the halves of the fastener.

In the case of a driving-belt the line for disconnecting the fastener could be carried along the back of the belt and supported in eyes.

The construction of the fastener might be varied, and it may be made of any suitable metal.

What I claim, and desire to secure by Letters Patent of the United States, is—

The herein-described releasing device, consisting of two members, one having a projecting plate and downwardly-extending stud and the other having two swinging levers to swing together and hold said stud, a swinging plate or piece to normally hold said levers together, and a sliding plate and means to normally hold said swinging plate, substantially as described.

In witness whereof I have hereunto set my hand in presence of two witnesses.

GUSTAV FISCHER.

Witnesses:
PAUL FISCHER,
W. BINCLEWALD.